United States Patent
Osswald et al.

(10) Patent No.: US 9,346,628 B2
(45) Date of Patent: May 24, 2016

(54) HANDLING DEVICE, PROCESSING SYSTEM AND METHOD FOR HANDLING AND PROCESSING A WORKPIECE

(71) Applicant: Hinterkopf GmbH, Eislingen (DE)

(72) Inventors: Steffen Osswald, Geislingen (DE); Joachim Weber, Bad Ditzenbach (DE); Joachim Schulz, Germany (DE); Stefan Drexler, Bad Uberkingen/Hausen (DE)

(73) Assignee: HINTERKOPF GMBH, Eislingen (DE)

( * ) Notice: Subject to any disclaimer, the term of this patent is extended or adjusted under 35 U.S.C. 154(b) by 0 days.

(21) Appl. No.: 14/465,970

(22) Filed: Aug. 22, 2014

(65) Prior Publication Data

US 2015/0053533 A1 Feb. 26, 2015

(30) Foreign Application Priority Data

Aug. 23, 2013 (EP) .................................. 13004175

(51) Int. Cl.
| | |
|---|---|
| *B65G 47/26* | (2006.01) |
| *B65G 47/86* | (2006.01) |
| *B65G 47/84* | (2006.01) |
| *B65G 47/91* | (2006.01) |
| *B65G 29/00* | (2006.01) |

(52) U.S. Cl.
CPC .............. *B65G 47/847* (2013.01); *B65G 29/00* (2013.01); *B65G 47/848* (2013.01); *B65G 47/915* (2013.01); *B65G 47/918* (2013.01)

(58) Field of Classification Search
CPC .... B65G 29/00; B65G 47/847; B65G 47/846; B65G 47/82; B65G 47/26

USPC .......................... 198/459.3, 473.1, 474.1, 430
See application file for complete search history.

(56) References Cited

U.S. PATENT DOCUMENTS

| | | | | | |
|---|---|---|---|---|---|
| 4,790,115 | A | * | 12/1988 | Focke | ..................... B65B 51/10 198/473.1 |
| 5,191,964 | A | * | 3/1993 | Spisak | ................. B65G 47/918 198/430 |
| 6,279,725 | B1 | * | 8/2001 | McBrady | ............. B65G 47/847 198/473.1 |
| 8,739,959 | B2 | * | 6/2014 | Breil | ...................... B21D 43/14 198/470.1 |
| 2002/0112939 | A1 | * | 8/2002 | Sumi | ................. A61F 13/15764 198/377.08 |

FOREIGN PATENT DOCUMENTS

| | | |
|---|---|---|
| DE | 10017050 | 10/2001 |
| DE | 102007011060 | 9/2008 |
| EP | 0770566 | 7/1999 |

* cited by examiner

*Primary Examiner* — James R Bidwell
(74) *Attorney, Agent, or Firm* — Hoffmann & Baron, LLP

(57) ABSTRACT

A handling device for handling workpieces including a rotor mounted for rotation about a rotor axis, a rotary drive for introducing a rotary motion into the rotor and at least one workholder assembly, the workholder assembly including at least two workholders, which are mounted on the rotor and designed for an at least paired picking up of workpieces at a pickup position and for an at least paired delivery of workpieces at a delivery position during the rotary motion of the rotor, and further including adjusting system, which is coupled to at least one workholder of the workholder assembly, and which is designed for a cyclical adjustment of a spacing of workholders of the workholder assembly as a function of the rotary motion of the rotor.

15 Claims, 3 Drawing Sheets

HANDLING DEVICE, PROCESSING SYSTEM AND METHOD FOR HANDLING AND PROCESSING A WORKPIECE

This application claims priority based on EP13004175, filed Aug. 23, 2013.

BACKGROUND OF THE INVENTION

The invention relates to a handling device for handling workpieces. The invention further relates to a processing system and a method for handling and processing a workpiece.

From EP 0 770 566 D1, a device for transferring objects, in particular hollow bodies such as cans and tubes, from an incoming conveying means to an outgoing conveying means is known. The device comprises at least one rotary-driven rotor, at least one retaining means for the objects, to which a vacuum can be applied and which is hinged to the rotor for common drive, at least one control means which is connected to the retaining means and which is positively guided along a control cam for generating a non-uniform conveying speed of the retaining means, wherein the retaining means is located on a pendulum shaft rotatable about the pivot axis for pivoting about a pivot axis which is parallel to the rotor axis, and wherein the vacuum at the retaining means is generated by an internal passage terminating at the end face of the pendulum shaft.

SUMMARY OF THE INVENTION

The invention is based on the problem of providing a handling device, a processing system and a method for handling and processing a workpiece, which can be adapted quickly and in a simple way to different conveying requirements.

This problem is solved for a handling device of the type referred to above by the features of claim 1. It is provided that this handling device comprises a rotor mounted for rotation about a rotor axis, a rotary drive for introducing a rotary motion into the rotor and at least one workholder assembly, the workholder assembly comprising at least two workholders which are mounted on the rotor and designed for an at least paired picking up of workpieces at a pickup position and for an at least paired delivery of workpieces at a delivery position during the rotary motion of the rotor, and that it further comprises adjusting means which are coupled to at least one workholder of the workholder assembly and which are designed for a cyclical adjustment of a spacing of workholders of the workholder assembly as a function of the rotary motion of the rotor.

With a handling device of this type, it is possible to handle workpieces, by adjusting a spacing of the workholders within a workholder assembly, fast and efficiently even if the workpieces, which may be aerosol can blanks or tube blanks for example, have to be picked up with a first spacing along the handling direction in accordance with a first pitch and delivered with a second, different spacing along the handling direction in accordance with a second pitch. By means of the handling device, unequal pitches for the spacing of the workpieces between an incoming conveying means and an outgoing conveying means can therefore be compensated for. In this context, it is advantageous that, with the workholders of a workholder assembly, a number of at least two workpieces can be picked up from the incoming conveying means at a pickup station and transferred to a delivery station, in particular simultaneously and synchronously, and that the workpieces on the workholder assembly can be delivered at the delivery station to the outgoing conveying means, in particular simultaneously and synchronously. During the movement between the pickup station and the delivery station, the spacing of the workpieces, which are picked up on the workholders of the workholder assembly at least in pairs or in numbers of more than two, is changed. This allows for the desired adaptation between the pitch of the workpieces as determined by the incoming conveying means and the pitch of the workpieces as determined by the outgoing conveying means. In a particularly preferred embodiment, it is provided that all workholders of a workholder assembly pick up the workpieces at the pickup station and/or deliver them at the delivery station simultaneously and thus synchronously. In addition or alternatively, it is provided that a spacing of the workpieces is changed synchronously for all workpieces picked up on the workholders of the workholder assembly between the pickup station and the delivery station.

Advantageous further developments of the invention form the subject matter of the dependent claims.

It is expedient if the adjusting means are designed for a translational or arcuate, in particular circular arcuate, movement of at least one workholder of a workholder assembly relative to a second workholder and relative to the rotor in a movement plane oriented perpendicular to the rotor axis. The movement plane is the plane in which the workholders are moved with the aid of the adjusting means along a straight or curved, in particular circular arcuate, track of motion for changing their spacing. Depending on the number of workholders forming a workholder assembly, it may be provided that there is a translational or arcuate movement of only one workholder or of several workholders relative to further workholders of the workholder assembly and to the rotor. Alternatively, it may be provided that all workholders of the workholder assembly are moved relative to one another. In an advantageous embodiment of the invention, it is provided that the workholder assembly comprises two workholders, both of which are moved relative to the rotor and therefore relative to one another for adapting the spacing of the workpieces. In another embodiment of the invention, it is provided that the workholder assembly is represented by an odd number of workholders, wherein a centrally located workholder does not move relative to the rotor, while pairs of workholders located adjacent to the central workholder perform a relative movement in opposite directions, covering a preset movement traverse or an integral multiple thereof.

In a further development of the invention, it is provided that the adjusting means are designed for a translational movement in opposite directions of two paired workholders of a workholder assembly which are slidably mounted on the rotor, perpendicular to a radial direction starting from the rotor axis. In a translational movement in opposite directions, it is provided that the paired workholders of the workholder assembly move in mutually opposite directions. It is preferably provided that the paired workholders are moved by the same amounts in identical periods of time. In a particularly preferred embodiment. It is provided that the workholders are moved in opposite directions at identical traversing speeds. The direction of movement for the workholders of a workholder assembly lies in the movement plane and is normal/perpendicular to a radial direction starting from the rotor axis and lying in the movement plane. Alternatively, the movement direction can be described as a tangent of a circle formed concentric with the rotor axis in the movement plane.

As the spacing of the workholders is adjusted during a movement of the rotor in practical applications, there is an overlap between the rotary motion for the workholders of the workholder assembly and the adjusting movement, at least for a part of the workholders mounted on the rotor. In principle, owing to their joint location on the rotor, all workholders of the workholder assembly perform the rotary motion about the rotor axis at a common angular velocity. By using the adjusting means, however, the angular velocities of individual workholders or all workholders of the workholder assembly can be influenced. If the adjusting means are designed such that the spacing of the workholders of a workholder assembly is adjusted by a relative pivoting movement of the workholders about the rotor axis in opposite directions, the respective pivoting movement for the individual workholder has an immediate influence on the angular velocity of the workholder in question. At pivoting movements about a pivot axis different from the rotor axis and at translational movements of the workholders, the relative movement of the workholders is reflected only proportionally in the angular velocities of the workholders. According to the invention, it is provided that pairs of workholders which are moved in opposite directions have an identical differential between an individual angular velocity and the angular velocity of the workholder assembly and of the rotor.

In an advantageous further development of the invention, it is provided that the workholders are designed for a location of an end region of the workpieces. It may for example be provided that the handling is designed for transferring the workpieces from the conveying means to a processing device equipped with a mounting mandrel, wherein the workpieces, which are sleeve-like in the illustrated embodiment, are to be placed on the mounting mandrel with an open end region, in which case a location of the end region of the workpieces which is opposite the open end region on the handling device is advantageous. For such a location of the end regions of the workpieces on the workholders, holding forces can, for example, be generated by applying a vacuum.

In a preferred embodiment, it is provided that several workholder assemblies, in particular several workholder assemblies mounted with identical angular pitch, are mounted on the rotor. In this case, several groups of workpieces can, during a rotary motion of the rotor about the rotor axis, be picked up synchronously, in particular simultaneously, by the relevant workholder assemblies, so that the handling device can have an advantageous output. The workholder assemblies are preferably arranged about the rotor axis at an identical angular pitch in order to ensure a simple motion sequence of the rotary motion of the rotor for picking up and delivering the workpieces. In addition, undesirable imbalances of the rotor are at least reduced.

It is advantageous if the adjusting means for the respective workholder comprise a steering lever which is movably coupled to the workholder and/or to the rotor and a control cam for the steering lever which is non-rotatable relative to the rotor axis, in order to generate during the rotary motion of the rotor an in particular rotational positive movement of the steering lever. The control cam has the purpose of adjusting a first end region of the steering lever, which lies against the control cam, between a minimum distance and a maximum distance from the rotor axis of the rotor during the rotary motion of the rotor. As a result, a second end region of the steering lever opposite the first end region performs, depending on the coupling of the steering lever to the rotor and/or to the workholder, a rotary and/or translational movement by means of which the spacing of the workholders can be adjusted as required. In an advantageous embodiment of the invention, the steering levers are pivotably mounted on the rotor and coupled to the associated workholders via a guide stud which is guided in a slot. In this embodiment, a pivoting movement of the steering lever results in a translational movement of the workholder, which is, in particular exclusively, guided for linear movement.

In an advantageous further development of the invention, it is provided that the control cam is surrounded in a control cam plane oriented perpendicular to a rotor axis of the rotor by a non-circular, in particular elliptical, envelope curve, and/or that the steering levers lie against the same control cams in the same way within workholders of adjacent workholder assemblies. If the envelope curve for the control cam is non-circular in respect to the rotor axis of the rotor, for example in the case of a circular envelope curve which is eccentric relative to the rotor axis or in the case of an elliptical envelope curve which is centric or eccentric relative to the rotor axis, it is ensured that the steering lever, which lies against this control cam with its first end region, has, within a full revolution of the rotor about the rotor axis, at least at one point a minimum distance from the rotor axis and at least at one other point a maximum distance from the rotor axis. This allows for the desired adjustment of the distance between the respective associated workholder and a further workholder. It is particularly advantageous if several workholder assemblies are arranged on any one rotor and if the steering levers of the workholders which are placed at the same point in the different workholder assemblies are controlled by the same control cams as well, resulting for the identically placed workholders in identical movements during the rotary motion of the rotor. This is based on the assumption the steering levers of the respective workholders are designed and arranged identically.

The adjusting means are preferably designed for a constant distance of workholders of a workholder assembly which are arranged in pairs from a central plane located in the middle between the workholders and containing the rotor axis in particular. By a symmetric arrangement of the workholder pairs relative to a central plane, the integration of the handling device into a processing system is facilitated in particular, because the centre of rotation of the rotor, through which the rotor axis passes, can be used as a reference for the installation of the processing system for this integration.

According to a second aspect, the problem on which the invention is based is solved by a processing system for processing workpieces. This processing system comprises a first conveying means designed for a provision of workpieces, a processing device designed for processing the workpieces provided by the first conveying means and for transferring the workpieces to a second conveying means and a second conveying means designed for carrying away the workpieces, with a handling device according to any of claims 1 to 10 being located between the first conveying means and the processing device and/or between the processing device and the second conveying means. The first and the second conveying means may be similar or different conveying means, for example chain conveyors, conveyor belts or loading stars. The conveying means pick up the workpieces positively and/or non-positively and/or by means of adhesion either at an end face or on a sleeve-shaped outer surface or through an end face opening in an interior region and carry them to a pickup station or away from a delivery station. The processing device may for example be a printing machine for printing an outer surface of the workpieces or a screw-on machine for attaching threaded caps to the workpieces, in particular tube blanks. Depending on the design of the processing device, the spacing of mounting mandrels or other pickup devices of the processing device for the workpieces can correspond to a pitch which differs from a spacing of the workpieces at the first and/or the second conveying means. Such pitch differentials can be compensated by means of the handling device. At least one handling device can be used, for example, if a processing device is to be integrated into an existing processing system with preset pitches of the conveying means.

In an advantageous further development of the processing system, it is provided that the processing device is designed for a discontinuous processing and for a discontinuous transfer of the workpieces, and that the first conveying means and/or the second conveying means is/are equipped with a conveying section which operates discontinuously at least in some regions. The processing device is for example designed in the manner of an indexing rotary table with a number of work accommodation units which are designed as mandrels in particular provided on a continuous circular cylindrical surface of a worktable. These work accommodation units may be arranged with identical angular pitch relative to a rotor axis of the worktable, or they may be combined to form groups of work accommodation units with fixed spacing, and the groups of work accommodation units may be arranged with identical angular pitch relative to a rotor axis of the worktable. The rotor axis is preferably oriented in the vertical direction, and the work accommodation units are arranged in a movement plane which is normal/perpendicular to the rotor axis of the worktable and therefore oriented horizontally. Accordingly, the workpieces, which are in particular sleeve-shaped, are accommodated at the worktable in such a way that longitudinal axes of the workpieces are oriented in the movement plane or in a workpiece plane which is parallel to the movement plane. The movement of the worktable about the rotor axis is a rotary step movement, i.e. a sequence of pivoting movements and dwell times, with the dwell times in particular capable of being used for a processing of the workpieces. To process the workpieces, suitable processing means, for example for screwing screw caps onto the workpieces or for printing on the workpieces, are located in the axial direction outside opposite the work accommodation units and/or below and/or above the work accommodation units. Owing to the discontinuous movement of the processing device, the workpieces are preferably fed to and carried away from the processing device discontinuously by means of the handling devices as well. For a provision of the workpieces and for carrying away the processed workpieces, it is provided that at least one of the conveying means is equipped with a conveying section which operates discontinuously at least in some regions. Optionally, it may be provided that the respective conveying means as a whole is designed for a discontinuous transfer of the workpieces. Alternatively, it may be provided that some regions of the conveying means are designed for a continuous transport of workpieces, while the conveying means is designed for a discontinuous transport of workpieces in the region of the handling device. A chain conveyor, for example, may comprise a conveying section where the conveying chain can be moved discontinuously by a plurality of deflection pulleys, a part of which is movably mounted, and by additional drive means.

In a further development of the processing system, it is provided that a spacing of the workpieces according to a first pitch is formed on the first conveying means, that a spacing of the workpieces according to a second pitch is formed on the processing device and that a spacing of the workpieces according to a third pitch is formed on the third conveying means, the first and/or the second handling device being designed for a compensation of different pitches during the rotary movement of the rotor.

According to a third aspect of the invention, the problem on which the invention is based is solved by a method for handling and processing a workpiece, the method comprising the following steps: the provision of a workpiece to a processing device by a first conveying means, the processing of the workpiece with the processing device and the carrying away of the workpiece from the processing device by a second conveying means, wherein the first conveying means and/or the second conveying means has/have a pitch for a spacing of the workpieces along a conveying direction which differs from that of the processing device and wherein a pitch for the workpieces is adapted between the first conveying means and the processing device and/or between the processing device and the second conveying means by reducing or increasing a spacing between at least two workpieces which are simultaneously taken off the first conveying means or transferred to the second conveying means. With this method, pitch differentials for the spacing of workpieces, which result from different pitches for work accommodation units at the conveying means and on the processing device, can be compensated.

In a variant of the method, it is provided that the spacing of the workpieces is adapted between the first conveying means and the processing device and/or between the processing device and the second conveying means by means of a handling device according to any of claims 1 to 9, and/or that the workpieces are conveyed at least in some sections discontinuously between the first conveying means, the processing device and the second conveying means.

BRIEF DESCRIPTION OF THE DRAWING

An advantageous embodiment of the invention is illustrated in the drawing, of which.

DETAILED DESCRIPTION OF THE PREFERRED EMBODIMENTS

Figure 1:
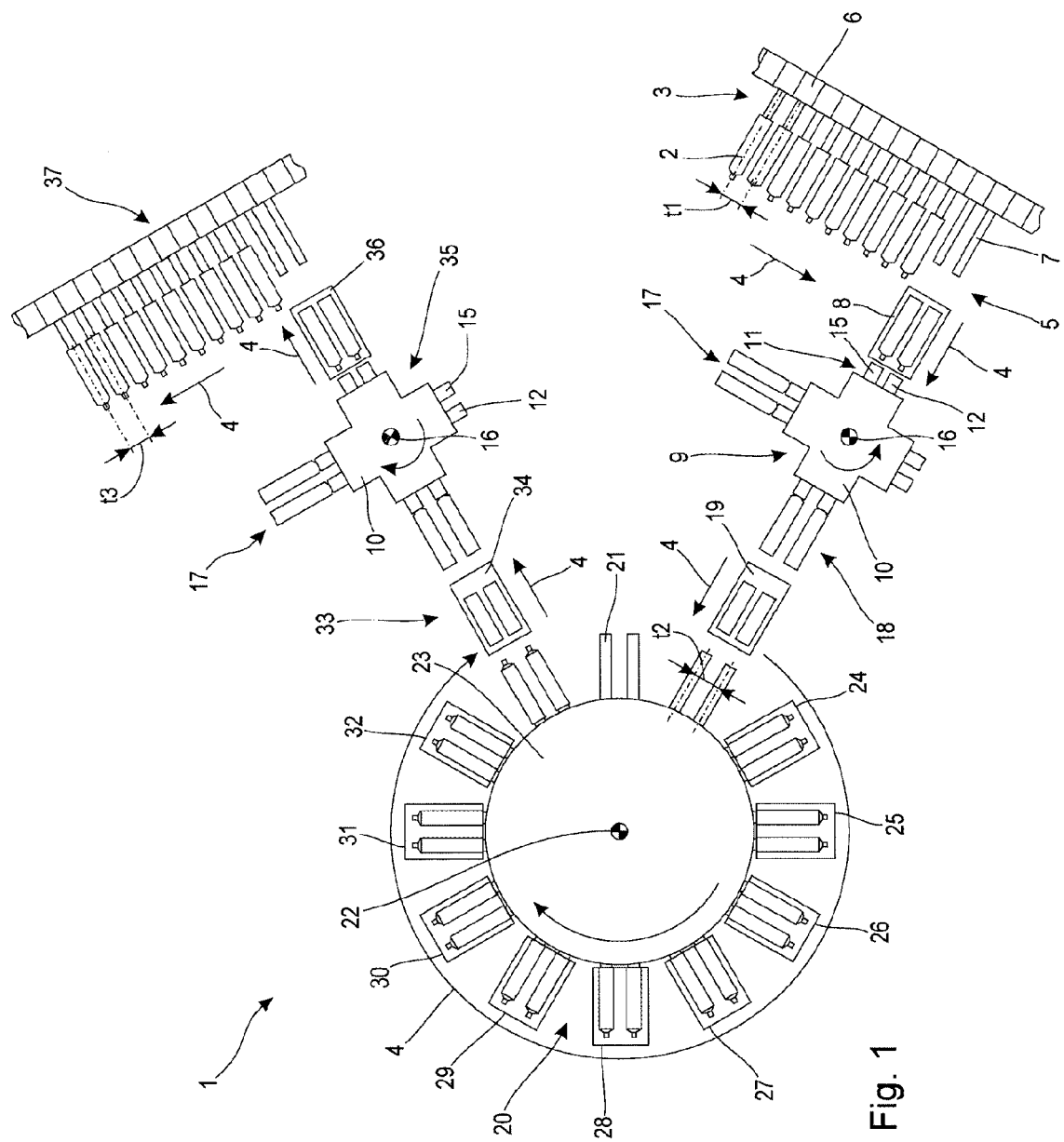
FIG. 1 is a diagrammatic top view of a processing system comprising a first conveying means, a first handling device, a processing device, a second handling device and a second conveying means.

FIG. 1 shows a processing system 1 for processing workpieces 2, which are represented by tube blanks in the illustrated embodiment. The workpieces 2 of the illustrated embodiment have a sleeve-shaped base body not identified in detail, the first end of which has a circular opening while the second end has an end region which is tapered and, for example, provided with a screw thread, where a screw cap can, for example, be fitted at a later stage.

The workpieces 2, which arrive from an upstream processing device not shown in the drawing, are provided at a pickup position 5 with the aid of a first conveying means 3, which is designed as a chain conveyor in the illustrated embodiment, along a conveying direction 4. For conveying the workpieces 2, each chain link 6 of the first conveying means 3 is fitted with a retaining bar 7 oriented perpendicular to the conveying direction 4, onto which the workpiece 2 is pushed with its open end leading. At the pickup position 5, the workpieces 2 are—in the illustrated embodiment in pairs, but in practical applications also in any other numbers greater than one—pulled off the retaining bars 7, in particular simultaneously, by means of a first transfer carriage 8 and moved in a translational manner along the central axis of the workpieces 2, which is not shown in the drawing, to a first handling device 9 in the conveying direction 4 of the transfer carriage 8.

In the illustrated embodiment, the first handling device 9 has a cruciform base body 10, a workholder assembly 11 comprising two workholders 12 and 15 being provided at each end face of the base body 10. The workholders 12, 15 are designed for the accommodation of the end faces of the workpieces 2 and can therefore pick up the workpieces 2 from the first transfer carriage 8. The first transfer carriage 8 can also be configured for returning to the pickup position 5 as soon as the workpieces 2 are received by the workholders 12, 15 and therefore performs a linear oscillating movement which is synchronised with a work cycle used for the first handling device 9 and for the first conveying means 3.

The first handling device 9 then performs a rotary step movement about a rotor axis 16, covering an angle of 90 degrees at each rotary step in the illustrated embodiment. The two workpieces 2 which have just been taken off the transfer carriage 8 are therefore moved into an intermediate position 17 in a first rotary step, from which they are moved on to a first transfer position 18 in a second rotary step. In the illustrated embodiment, this results in a semicircular handling path for the workpieces 2. Depending on requirements, other handling paths such as quarter circles or three quarter circles can be provided.

In the first transfer position 18, a second transfer carriage 19 is provided for pulling the workpieces 2 made available by the first handling device 9 off the workholders 12, 15 and for making them available to the processing device 20 in a translational movement along the conveying direction 4, which movement is a part of a linear oscillating movement. The processing device 20 is provided with mounting mandrels 21, which are rotatable about their longitudinal axes and which are in particular fitted with drive means not shown in the drawing, for receiving the workpieces 2. In the illustrated embodiment, the mounting mandrels 21 are mounted on a worktable 23, which is mounted for rotation about a rotor axis 22 and provided with a drive device not shown in the drawing.

The processing device supports processing stations 24, 25, 26, 27, 28, 29, 30, 31, 32, which in the illustrated embodiment are designed for processing the cylindrical outer surface of the workpieces 2. The processing station 24 may for example be a checking station where the surface of the workpieces 2 is examined for faults. The processing stations 25, 26, 27 and 28 are used to apply different paints to the surface of the workpieces 2 and to cure these paints. At the processing stations 30, 31 and 32, the processed workpieces 2 are subjected to a final check. In order to allow for a correct processing of the workpieces 2 at the processing stations 25 to 32, it is provided that the workpieces 2 remain at the respective processing stations 25 to 32 for a short time. For this purpose, the rotation of the worktable 23 about the rotor axis 22 is performed as a rotary step movement. In the illustrated embodiment, an angle of 30 degrees is covered by the pairs of mounting mandrels 21 in each rotary step. The movement of the worktable 23 therefore is a discontinuous handling movement for the workpieces 2, because, starting with a stationary condition of the worktable 23, there is an acceleration immediately followed by a deceleration of the worktable 23 to a standstill, in which process the workpieces 2 are within this circular movement conveyed along the conveying direction 4 from one processing station to a downstream processing station.

At a second transfer position 33, the workpieces 2 are pulled off the mounting mandrels 21 by means of a third transfer carriage 34 and conveyed along the conveying direction 4 to a second handling device 35. The structure of the second handling device 35 is identical to that of the first handling device 9, so that the same descriptions and reference numbers can be used for identical components. In the illustrated embodiment, the second handling device 35 conveys pairs of work pieces with the associated workholder assemblies 11 in a rotary step mode via the intermediate position 17 and a fourth transfer carriage 16 to the second conveying means 37. In the illustrated embodiment, the second conveying means 37 is likewise designed as a chain conveyor, so that the same descriptions and reference numbers as in the case of the first conveying means 3 are used for identical components.

In the illustrated embodiment, it is provided that the first conveying means 3 has a first pitch t1 for a spacing of the workpieces 2 along the conveying direction 4. The paired mounting mandrels 21 of the processing device 20 have a second pitch t2 for a spacing of the workpieces 2, which in the illustrated embodiment differs from the first pitch t1, being in particular greater than the first pitch t1. The second conveying means 37 has a third pitch t3 for a spacing of the workpieces 2 along the conveying direction 4. In the illustrated embodiment, it is provided that the first and the second conveying means 3, 37 are structured identically, so that the pitch t1 corresponds to the pitch t3. In an embodiment of the processing system which is not shown in the drawing, the first and second conveying means have different pitches for a spacing of the workpieces along the conveying direction, and it may further be provided that the processing device has a further pitch which differs from the different pitches of the conveying means.

The handling devices 9 and 35 therefore have the task of pitch compensation in order to convey the workpieces 2 along the conveying direction 4 as smoothly as possible. The handling devices 9 and 35 solve this problem by providing that a spacing between the workpieces 2, which are held at the respective workholder assembly 11 at least in pairs, is changed. In the illustrated embodiment, it is provided that the workpieces 2 picked up from the first conveying means 3 with the pitch t1 are adapted, in the process of the semicircular rotary motion of the handling device, to the pitch t2 provided at the processing device 20 for the mounting mandrels 21 by a parallel and oppositely directed displacement of the workpieces 2. In contrast, the handling device 35 has the task of adapting the workpieces 2 provided by the processing device 20 with the pitch t2 in the process of the rotary motion to the pitch t3 by a parallel and oppositely directed displacement of the workpieces 2.

In the illustrated embodiment, it is provided that the workpieces 2 are located on the workholders 12, 15 of the workholder assembly 11 in a mutually parallel orientation. In the embodiment of the handling devices 9, 37, the spacing of the workpieces 2 is adjusted by a parallel and mutually opposite traversing of the workpieces 2. In an embodiment of the handling device which is not shown in the drawing, a combination of a traversing movement and a pivoting movement or an exclusive pivoting movement of the workholders may be provided; such variants are in particular required in the case of different conveying means not shown in the drawing.

Figure 2:
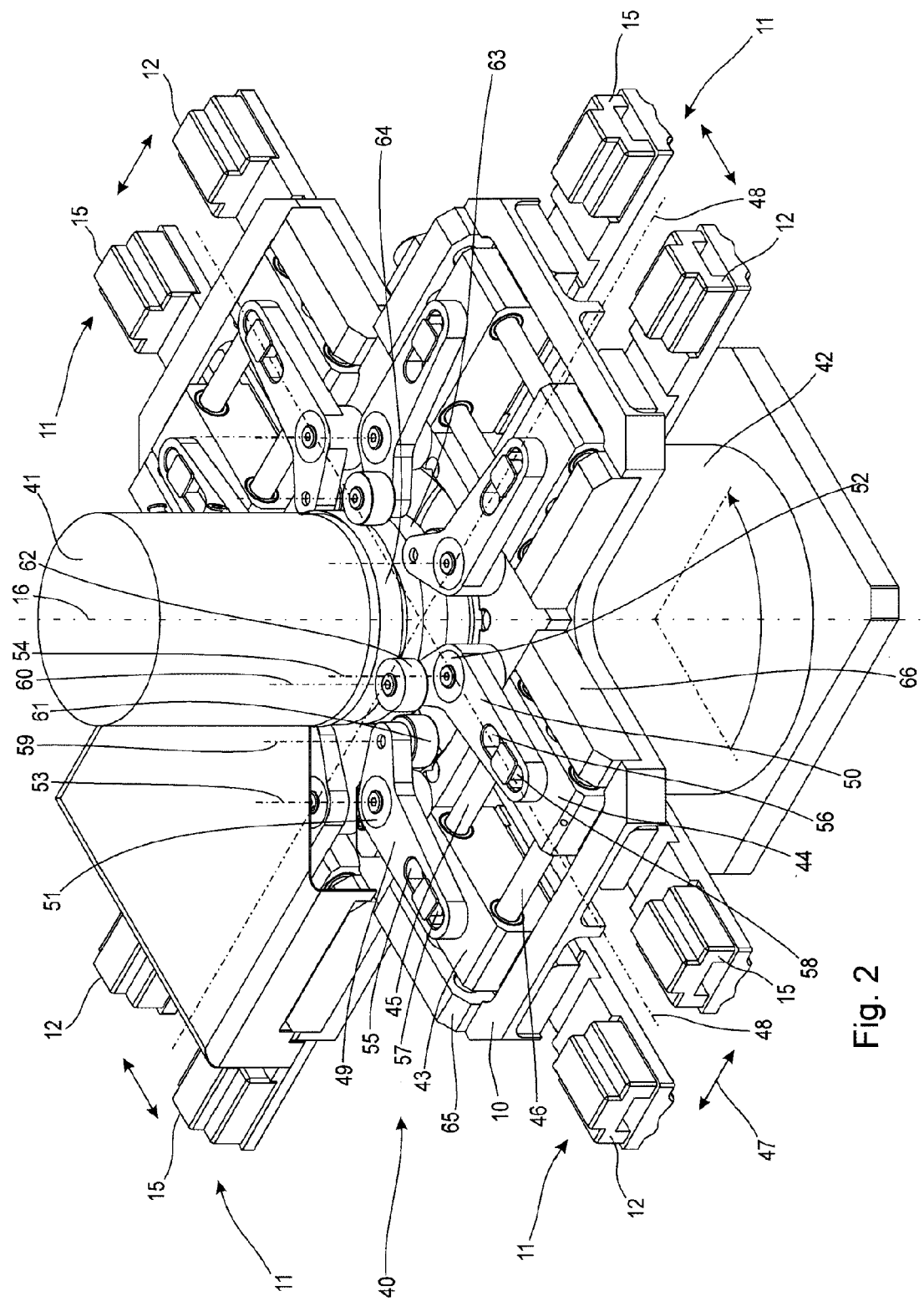
FIG. 2 is a perspective view of the handling device from FIG. 1, with a rotor and four workholder assemblies fitted to the rotor by way of example.
Figure 3:
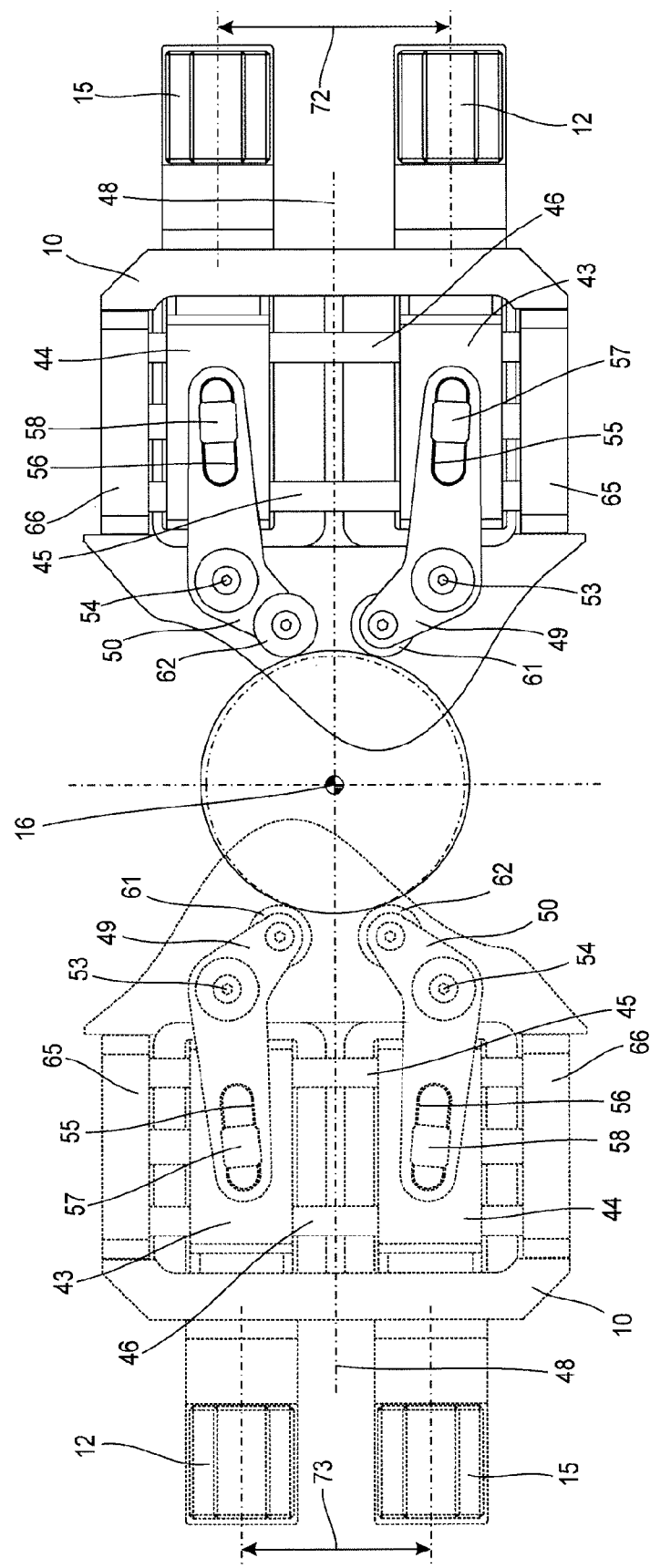
FIG. 3 is a top view of one of the workholder assemblies of the handling device in two different movement phases.

FIG. 2 is a more detailed representation of the handling device 9. The handling device 9 comprises a rotor 40 which is rotatably mounted relative to the rotor axis 16. In the illustrated embodiment, four workholder assemblies 11, each comprising two workholders 12, 15 in the illustrated embodiment, are mounted on the rotor 40 with an offset of 90 degrees each relative to the rotor axis 16. The workholders 12, 15 shown in FIG. 2 are not directly used for picking up end regions of the workpieces 2, but form interfaces for adapters not shown in the drawing, by means of which the end regions of the workpieces 2 can be picked up. It is preferably provided that a vacuum is applied at the adapters not shown in the drawing, in order to ensure a reliable location of the workpieces 2 at the adapters. The handling device 9 further comprises a rotary drive 41, which in the illustrated embodiment is designed as a servomotor, in particular a three-phase asynchronous motor, for introducing a rotary motion into the rotor 40. For an isogonal positioning of the workholder assemblies 11, a rotary angle sensor not shown in the drawing and a selection device likewise not shown in the drawing are assigned to the rotary drive 41; these supply the rotary drive 41 with energy in such a way that it can precisely approach the desired angular positions in the intermittent rotary step mode. Between the rotary drive 41 and the rotor 40, a reduction gear not shown in detail and accommodated in a gear housing 42 is provided, whereby the rotary motion of the rotary drive 41 can be decelerated and the rotary positioning process can be made more precise. By arranging the workholder assemblies 11 on the base body 10 of the rotor 40, which is cruciform in the illustrated embodiment, all of the workholder assemblies 11 are always moved around the rotor axis at the same angular velocity. In order to be nevertheless able to adapt the pitch, the illustrated embodiment provides that a spacing of the workholders 12 can be altered in the course of the rotary motion of the rotor 40. In the embodiment of the invention which is shown in FIGS. 1 to 3, the spacing of the workholders 12, 15 is changed by a parallel displacement of the workholders 12, 15 in opposite directions. In the illustrated embodiment, it is provided that both workholders 12, 15 are subjected to linear displacement by the same amount in opposite directions. By this linear displacement, which happens during the rotary motion of the rotor 40, the angular velocity is increased for one workholder 12, 15, which is subjected to a linear motion component in the direction towards a higher angular velocity in the adjustment process. For the other workholder 12, 15, there is an equal reduction of angular velocity caused by the linear motion component directed against the direction towards a higher angular velocity.

For adjusting the spacing of the workholders 12, 15 during the rotary motion of the rotor 40, each of the workholders 12, 15 is mounted on a bearing pedestal 43, 44. Each of the bearing pedestals 43, 44 is mounted for sliding movement on guide bars 45, 46 oriented parallel to one another. This allows a parallel displacement of the workholders 12, 15 along a motion axis 47 located in a motion plane not shown in the drawing, which is oriented normal to the rotor axis 16. In the illustrated embodiment, the motion axes 47 are oriented normal to radial axes 48, the radial axes 48 of the embodiment of the handling device 9 as shown in FIG. 2 intersecting one another in the rotor axis 16. The radial axis 48 and the rotor axis 16 define a central plane which is likewise not shown in the drawing and which, in the embodiment of the handling device 9 as shown in FIG. 2, forms a mirror symmetry plane for the opposite translational movement of the workholders 12, 15.

For introducing the desired movement of the two workholders 12, 15 relative to one another and to the base body 10 of the rotor 40, each of the bearing pedestals 43, 44 is assigned a steering lever 49, 50, which serves as an adjusting means and is movably coupled to the respective bearing pedestal 43, 44 and to the rotor 40. In the illustrated embodiment, the steering levers 49, 50 are mounted on the base body 10 of the rotor 40 by means of a pivot bearing 51, 52 each for pivoting about pivot axes 53, 54. In order to avoid a static overdetermination and to allow the pivoting movements of the steering levers 49, 50 to be converted into translational movements of the bearing pedestals 43, 44 and the workholders 12, 15 mounted thereon, the steering levers 49, 50 are coupled to the bearing pedestals 43, 44 via a combination of a slot 55, 56 formed in each steering lever 49, 50 with a pivot pin 57, 58 located in the associated bearing pedestal 43, 44.

In an end region of each steering lever 49, 50 which is located opposite the respective slot 55, 56, a bearing roller 61, 62 is fitted, which is rotatably mounted and preferably has an axis of rotation 59, 60 oriented parallel to the rotor axis 16. Each of the bearing rollers 61, 62 lies against one of, for example, two control cams 63, 64, which are non-rotatable relative to the rotor axis 16 in the illustrated embodiment. The control cams 63, 64 may, for example, be designed as circular discs arranged eccentrically relative to the rotor axis 16, in which case the eccentricity of the control cams 63, 64 is chosen such that the steering levers 49, 50 can, when traversing a pivot angle range of 180 degrees about the rotor axis 16, be moved from a position of maximum spacing, which may correspond to the pitch t2, for example, to a position of minimum spacing, which may correspond to the pitch t1 or t3, or vice versa. In order to ensure a reliable contact of the bearing rollers 61, 62 assigned to the steering lever 49, 50 with the control cams 63, 64, pressure-preloaded spring means not shown in detail are provided between the bearing pedestals 43, 44 and holders 65, 66 for the guide bars 45, 46, which are located on the base body 10 of the rotor 40. The pressure applied by the spring means always presses the bearing rollers 61, 62 against the control cams 63, 64, whereby the positive movement of the bearing pedestals 43, 44 and the workholders 12, 15 mounted thereon is ensured. In the illustrated embodiment, it is further provided that the steering levers 49 of the workholders 12, which in each case are arranged in the same way within the workholder assembly 11, lie against the same control cam 63 with their bearing rollers 61, and that the steering levers 50 of the workholders 15, which in each case are arranged in the same way within the workholder assembly 11, lie against the same control cam 64 with their bearing rollers 62.

As the view of FIG. 3, in which a section of the rotor 40 with the workholder assembly 11 mounted thereon is illustrated in two different operating positions pivoted about 180 degrees relative to one another in the illustrated embodiment, shows, the two bearing rollers 61, 62 lie against a control cam 67, which is greatly simplified in FIG. 3. In contrast to the control cams 63, 64 shown in FIG. 2, the control cam 67 has a non-circular envelope curve, which becomes clear in a comparison with the circular path 68, which is exclusively drawn in for illustrating the non-circularity of the control cam and the centre 69 of which coincides with the rotor axis, which is oriented normal to the drawing plane of FIG. 3. The control cam 67 is designed such that a radial distance 70 of the bearing rollers 61, 62 from the centre 69 is, in the first position of the workholder assembly 11 shown on the right-hand side, greater than a radial distance 70 of the bearing rollers 61, 62 from the centre 69 in the first position of the workholder assembly 11 shown on the left-hand side. By altering the distance of the bearing rollers 61, 62 from the centre 69 during a rotary motion about the rotor axis, the desired pivoting movement of the steering levers 49, 50, which results in a parallel displacement of the bearing pedestals 54, 44 and the workholders 12, 15 mounted thereon, is obtained. Irrespective of whether the rotor 40 rotates continuously or discontinuously about the rotor axis, the result for the workholders 12, 15 is the spacing determined by the pivoting angle, with a first spacing 72 corresponding to the pitch t1 in the illustrated embodiment in the right-hand illustration of the workholder assembly 11 and a second spacing 73 corresponding to the pitch t2 in the illustrated embodiment in the left-hand illustration of the workholder assembly 11.

In an embodiment of the invention not shown in the drawing, the workholders are not adjusted relative to one another by means steering levers mechanically controlled by the control cams, but rather by means of electric or fluidic, in particular pneumatic, drives. The adjusting means may accordingly be designed as electric linear drives, linear direct drives, spindle drives or rotary drives, in particular geared motors. Such electric drives can for example, be controlled by scanning a rotatory position of the rotor. For this purpose, one or more markings which can be scanned or read by a sensor device are applied to the gear housing, for example: these markings can provide information on the pivoting angle currently adopted by the rotor in order to adjust the spacing of the workholders as required. If the adjusting means are designed as fluidic drives, in particular actuating cylinders or rotary actuators, the adjustment range of the workholders can be altered by simple means, for example by adjusting suitable mechanical stops. The fluidic drives can, for example, be controlled by associated shuttle valves which are moved past control cams arranged in a fixed position relative to the rotor axis during the rotation of the rotor and in this process switch the pressure supply for the respective drive, causing it to increase or reduce the spacing of the workholders as required.

In a further variant of the invention, it is provided that the workholders of a workholder assembly can be adjusted within an adjustment range which is greater than a presettable pitch, in particular greater than a pitch of the incoming conveying means. In this way, for example, at least single vacancies on the incoming conveying means can be overcome, for example positions on the conveying means where there is no workpiece because it has already been removed at an earlier processing stage.

The invention claimed is:

1. A handling device for handling workpieces, comprising a rotor mounted for rotation about a rotor axis, a rotary drive for introducing a rotary motion into the rotor and at least one workholder assembly, the workholder assembly comprising at least two workholders, which are mounted on the rotor and designed for an at least paired picking up of workpieces at a pickup position and for an at least paired delivery of workpieces at a delivery position during the rotary motion of the rotor, and further comprising adjusting means, which are coupled to at least one workholder of the workholder assembly, and which are designed for a cyclical adjustment of a spacing of workholders of the workholder assembly as a function of the rotary motion of the rotor, wherein the spacing is adjusted by a linear parallel displacement of the least one workholder of the workholder assembly with respect to a second workholder of the workholder assembly.

2. A handing device according to claim 1, wherein the adjusting means are designed for a translational movement of the at least one workholder of the workholder assembly relative to the second workholder and relative to the rotor in a movement plane oriented perpendicular to the rotor axis.

3. A handling device according to claim 1, wherein the workholders mounted on the rotor are designed for a rotary motion about the rotor axis with a common angular velocity, and wherein the adjusting means are designed for a paired influence on the angular velocities of individual workholders in opposite directions.

4. A handling device according to claim 1, wherein the workholders of the workholder assembly are always oriented parallel to one another and/or are designed for a location of an end region of the workpieces.

5. A handling device according to claim 1, wherein several workholder assemblies mounted with identical angular pitch, are mounted on the rotor.

6. A handling device for handling workpieces, comprising a rotor mounted for rotation about a rotor axis, a rotary drive for introducing a rotary motion into the rotor and at least one workholder assembly, the workholder assembly comprising at least two workholders, which are mounted on the rotor and designed for an at least paired picking up of workpieces at a pickup position and for an at least paired delivery of workpieces at a delivery position during the rotary motion of the rotor, and further comprising adjusting means, which are coupled to at least one workholder of the workholder assembly, and which are designed for a cyclical adjustment of a spacing of workholders of the workholder assembly as a function of the rotary motion of the rotor,
    according to claim 1, wherein the adjusting means for the respective workholder comprise a steering lever, which is movably coupled to the workholder and/or to the rotor and a control cam for the steering lever, which is non-rotatable relative to the rotor axis, in order to generate during the rotary motion of the rotor a rotational positive movement of the steering lever.

7. A handling device according to claim 6, wherein the control cam is surrounded in a control cam plane oriented perpendicular to a rotor axis of the rotor (40) by an elliptical, envelope curve, and/or wherein the steering levers lie against the same control cams in the same way within workholders of adjacent workholder assemblies.

8. A handling device according to claim 1, wherein the adjusting means are designed for a constant distance of workholders of a workholder assembly, which are arranged in pairs from a central plane located in the middle between the workholders and containing the rotor axis.

9. A processing system for processing workpieces comprising a first conveying means designed for a provision of workpieces, a processing device designed for processing the workpieces provided by the first conveying means and for transferring the workpieces to a second conveying means, and a second conveying means designed for carrying away the workpieces, with a handling device according to claim 1 being located between the first conveying means and the processing device and/or between the processing device and the second conveying means.

10. A processing system according to claim 9, wherein the processing device is designed for a discontinuous processing and for a discontinuous transfer of the workpieces, and wherein the first conveying means and/or the second conveying means is/are equipped with a conveying section which is assigned to the respective handling device and which operates discontinuously at least in some regions.

11. A handing device for handling workpieces, comprising a rotor mounted for rotation about a rotor axis, a rotary drive for introducing a rotary motion into the rotor and at least one workholder assembly, the workholder assembly comprising at least two workholders, which are mounted on the rotor and designed for an at least paired picking up of workpieces at a pickup position and for an at least paired delivery of workpieces at a delivery position during the rotary motion of the rotor, and further comprising adjusting means, which are coupled to at least one workholder of the workholder assembly, and which are designed for a cyclical adjustment of a spacing of workholders of the workholder assembly as a function of the rotary motion of the rotor,
    wherein the adjusting means are designed for a translational movement in opposite directions of paired workholders of a workholder assembly, which are slidably mounted on the rotor, perpendicular to a radial direction starting from the rotor axis.

12. A processing system for processing workpieces comprising a first conveying means designed for a provision of workpieces, a processing device designed for processing the workpieces provided by the first conveying means and for transferring the workpieces to a second conveying means, a second conveying means designed for carrying away the workpieces, and a handling device located between the first conveying means and the processing device and/or between the processing device and the second conveying means,
  wherein the handling device comprises a rotor mounted for rotation about a rotor axis, a rotary drive for introducing a rotary motion into the rotor and at least one workholder assembly, the workholder assembly comprising at least two workholders, which are mounted on the rotor and designed for an at least paired picking up of workpieces at a pickup position and for an at least paired delivery of workpieces at a delivery position during the rotary motion of the rotor, and further comprising adjusting means, which are coupled to at least one workholder of the workholder assembly, and which are designed for a cyclical adjustment of a spacing of workholders of the workholder assembly as a function of the rotary motion of the rotor, and
  wherein the processing device is designed for a discontinuous processing and for a discontinuous transfer of the workpieces, and
  wherein the first conveying means and/or the second conveying means is/are equipped with a conveying section which is assigned to the respective handling device and which operates discontinuously at least in some regions, and
  wherein a spacing of the workpieces according to a first pitch is formed on the first conveying means, and wherein a spacing of the workpieces according to a second pitch is formed on the processing device, and wherein a spacing of the workpieces according to a third pitch is formed on the third conveying means, the handling device being designed for a compensation of different pitches during the rotary motion of the rotor.

13. A method for handling and processing a workpiece comprising the steps of:
  providing a workpiece to a processing device by a first conveying means;
  processing the workpiece with the processing device;
  carrying away the workpiece from the processing device by a second conveying means, wherein the first conveying means and/or the second conveying means has/have a pitch for a spacing of the workpieces along a conveying direction which differs from that of the processing device; and
  adapting a pitch for the workpieces between the first conveying means and the processing device and/or between the processing device and the second conveying means by reducing or increasing a spacing between at least two workpieces which are simultaneously taken off the first conveying means or transferred to the second conveying means,
  wherein the spacing is reduced or increased by linearly displacing the two workpieces by the same amount in parallel opposite directions.

14. A method according to claim 13, wherein the workpieces are conveyed at least in some sections discontinuously between the first conveying means, the processing device and the second conveying means.

15. A method according to claim 13, wherein the spacing of the workpieces is adapted between the first conveying means and the processing device and/or between the processing device and the second conveying means by means of a handling device, and wherein the handling device comprises a rotor mounted for rotation about a rotor axis, a rotary drive for introducing a rotary motion into the rotor and at least one workholder assembly, the workholder assembly comprising at least two workholders which are mounted on the rotor and designed for an at least paired picking up of workpieces at a pickup position and for an at least paired delivery of workpieces at a delivery position during the rotary motion of the rotor, and further comprising adjusting means which are coupled to at least one workholder of the workholder assembly and which are designed for a cyclical adjustment of a spacing of workholders of the workholder assembly as a function of the rotary motion of the rotor, and wherein the adjusting means are designed for a translational movement of at least one workholder of the workholder assembly relative to a second workholder and relative to the rotor in a movement plane oriented perpendicular to a radial direction starting from the rotor axis.

* * * * *